United States Patent
Kwak

[19]

[11] Patent Number: 6,128,341
[45] Date of Patent: Oct. 3, 2000

[54] MOTION ESTIMATION METHOD AND APPARATUS EMPLOYING SUB-SAMPLING TECHNIQUE

[75] Inventor: Chang-Min Kwak, Seoul, Rep. of Korea

[73] Assignee: Daewoo Electronics Co., Ltd., Seoul, Rep. of Korea

[21] Appl. No.: 09/132,522

[22] Filed: Aug. 11, 1998

[30] Foreign Application Priority Data

Aug. 13, 1997 [KR] Rep. of Korea .................. 97-38532

[51] Int. Cl.[7] .................. H04N 7/12; H04B 1/66
[52] U.S. Cl. .................. 375/240; 382/232
[58] Field of Search .................. 348/384, 390, 348/400, 401, 402, 407, 409, 415, 416, 417, 424, 425, 699, 700, 845; 382/232, 234, 236, 238; 375/240.2; H04N 7/12; H04B 1/66

[56] References Cited

U.S. PATENT DOCUMENTS

| | | |
|---|---|---|
| 5,057,918 | 10/1991 | Denoyelle et al. . |
| 5,247,355 | 9/1993 | Frederiksen . |
| 5,488,419 | 1/1996 | Hui et al. .................. 348/402 |
| 5,682,209 | 10/1997 | Borgwardt .................. 348/699 |
| 5,825,421 | 10/1998 | Tan .................. 348/409 |
| 5,844,613 | 12/1998 | Chaddha .................. 348/416 |
| 5,847,776 | 12/1998 | Khmelnitsky et al. .................. 348/699 |
| 5,974,187 | 10/1999 | Lee .................. 382/242 |
| 5,978,033 | 11/1999 | Ohinishi .................. 348/416 |
| 5,990,978 | 11/1999 | Kim et al. .................. 348/663 |
| 6,018,368 | 1/2000 | Kim et al. .................. 348/416 |

*Primary Examiner*—Chris S. Kelley
*Assistant Examiner*—Tung Vo
*Attorney, Agent, or Firm*—Anderson Kill & Olick, P.C.

[57] ABSTRACT

In an apparatus for performing motion estimation (ME) on a block of N×M pixels in a current frame based on a predetermined reference frame (RF), a block divider divides the block into subblocks (SB's) of K×L pixels and then classifies the SB's into A-group SB's and B-group SB's in accordance with the rule that all of the SB's in a same group be diagonally adjacent to each other. A first and a second decision circuits decide pixels satisfying a first and a second predetermined conditions among the pixels in the ASB's as A-group representative pixels (ARP's) and in the BSB's as B-group representative pixels (BRP's), respectively, wherein the first predetermined condition is different from the second predetermined condition. A sample block generator combines the ARP's with the BRP's to generate a sample block. And then, RF subsampling circuit generates a sample RF (SRF) by subsampling the predetermined RF in accordance with the same subsampling method described above. A best matching candidate block (CB) detector, based on the sample block and the SRF, detects a CB having a smallest error value to the sample block among CB's within the SRF as a best matching CB (BMCB) by using a predetermined block matching method. And a motion vector (MV) generator generates a MV representing a displacement between the sample block and the BMCB.

16 Claims, 4 Drawing Sheets

MOTION ESTIMATION METHOD AND APPARATUS EMPLOYING SUB-SAMPLING TECHNIQUE

FIELD OF THE INVENTION

The present invention relates to a motion estimation method and apparatus; and, more particularly, to a motion estimation method and apparatus employing a subsampling technique.

DESCRIPTION OF THE PRIOR ART

In digital video systems such as video-telephone, teleconference and high definition television (HDTV) systems, a large amount of digital data is needed to define a video frame signal since a video line signal in the video frame signal comprises a sequence of digital data referred to as pixel values.

Since, however, the available frequency bandwidth of a conventional transmission channel is limited, in order to transmit the substantial amount of digital data therethrough, it is necessary to compress or reduce the volume of the data through the use of various data compression techniques, especially, in the case of such low bit-rate video signal encoders as video-telephone and teleconference systems.

Among the various video compression techniques, a motion compensated inter-frame coding technique, which utilizes temporal redundancies of video signals between two adjacent video frames, is known to be one of the most effective compression techniques.

In the motion compensated inter-frame coding technique, current frame data is predicted from previous frame data based on an estimation of the motion and differences between corresponding pixel data in the current and the previous frames.

One of the motion vector estimation schemes which have been proposed in the art is a block matching algorithm, wherein a current frame is divided into a plurality of equal-sized search blocks, a typical size of each search block ranging between 8×8 and 32×32 pixels, and the previous frame is divided into a corresponding number of large search regions, each search region being further divided into a multiplicity of candidate blocks of an identical size with that of the search block.

To determine a motion vector for a search block in the current frame, a similarity calculation is performed between the search block of the current frame and each of a plurality of candidate blocks included in a corresponding search region within the previous frame. An error function such as mean square error (MSE) function or mean absolute error (MAE) function is used to carry out the similarity calculation between the search block of the current frame and each of the candidate blocks in the search region.

The MSE and MAE functions may be expressed as follows:

$$MSE = \frac{1}{H \times V} \sum_{i=1}^{H} \sum_{j=1}^{V} (I(i,j) - P(i,j))^2,$$

$$MAE = \frac{1}{H \times V} \sum_{i=1}^{H} \sum_{j=1}^{V} |I(i,j) - P(i,j)|,$$

wherein H×V represents the size of a search block; I(i,j) represents the luminance level of a pixel at a coordinate (i,j) in the search block; and P(i,j) represents the luminance level of a corresponding pixel at the coordinate (i,j) in a candidate block.

And in the conventional block matching algorithm, a displacement vector between the search block and a best matching candidate block is chosen as a motion vector (MV), wherein the best matching candidate block is a candidate block that minimizes the error function.

The MV and an error signal which represents a difference between the search block and the best matching candidate block are then encoded and transmitted to a receiver, respectively. The encoded MV and the encoded error signal are used at the receiver to reconstruct the current frame based on its previous frame on a block-by-block basis.

Meanwhile, in accordance with a conventional motion estimation method and apparatus, the so-called subsampling technique is employed to further reduce the amount of the encoded data and the processing time thereof.

Referring to FIG. 1, there is illustrated a block diagram of a conventional motion estimation apparatus 100 comprising subsampling circuits. The apparatus 100 comprises a first subsampling circuit 130, a second subsampling circuit 140 and a motion estimation circuit 150.

In the apparatus 100, a block, e.g., a search block of N×M pixels in a current frame is fed to the first subsampling circuit 130, wherein N and M are predetermined positive integers, respectively. And a reference frame, e.g., a previous frame, is inputted to the second subsampling circuit 140.

The first subsampling circuit 130 performs subsampling on the block in the current frame by using a conventional subsampling method to thereby provide a sub sampled block as a sample block to the motion estimation circuit 150 via a line L5.

In accordance with the conventional subsampling method, the block in the current frame is divided into a plurality of equal-sized subblocks of K×L pixels, respectively, wherein K and L are predetermined positive integers which are dividers of N and M, respectively. And then, among K×L pixels, a pixel located at a predetermined position in the subblock is selected as a representative pixel for the subblock. In this way, representative pixels (RP's) are obtained for all of the subblocks and then, the RP's are combined to thereby provide a sample block corresponding to the block.

For example, referring to FIGS. 2A and 2B, there are shown a block 20 of 16×16 pixels and a sample block 29 of 8×8 pixels for use in describing the conventional subsampling method. Referring to FIG. 2A, the block 20 is divided into a plurality of subblocks of 2×2 pixels. And then, a pixel located at the bottom right-most position in a subblock is selected as a RP. In this way, RP's for all of the subblocks of the block 20 are obtained to thereby provide the sample block 29 corresponding to the block 20, wherein the RP's are expressed as hatched regions in FIG. 2A and FIG. 2B, respectively.

The second subsampling circuit 140 performs subsampling on the reference frame by using the same subsampling method as that described in the above to thereby provide a subsampled reference frame as a sample reference frame to the motion estimation circuit via a line L7.

The motion estimation circuit 150 performs a motion estimation on the sample block based on the sample reference frame by using a conventional block matching method to thereby generate a MV corresponding to the sample block.

However, the conventional motion estimation method and the apparatus employing a conventional subsampling technique such as described above could not overcome a deterioration of motion estimation accuracy which may occur in case the motion estimation is performed on a sample block of a block in a frame having a high activity or high pixel value variation thereof.

SUMMARY OF THE INVENTION

It is, therefore, a primary object of the present invention to provide a motion estimation method and apparatus employing a subsampling technique capable of enhancing the motion estimation accuracy thereof.

In accordance with the present invention, there is provided an apparatus for performing a motion estimation on a block of N×M pixels within a current frame based on a predetermined reference frame, N and M being predetermined positive integers, respectively, the apparatus comprising: a block dividing circuit for dividing the block into a plurality of subblocks (SB's) of K×L pixels and then classifying the SB's into A-group SB's and B-group SB's in accordance with the rule that all of the SB's in a same group be diagonally adjacent to each other, thereby providing the A-group SB's (ASB's) and the B-group SB's (BSB's), wherein K and L are predetermined positive integers which are dividers of N and M, respectively; a first decision circuit for deciding a pixel satisfying a first predetermined condition among the pixels in each of the ASB's as an A-group representative pixel for said each of the ASB's to thereby supply A-group representative pixels (ARP's) corresponding to the ASB's; a second decision circuit for deciding a pixel satisfying a second predetermined condition among the pixels in each of the BSB's as a B-group representative pixel for said each of the BSB's to thereby supply B-group representative pixels (BRP's) corresponding to the BSB's, wherein the second predetermined condition is different from the first predetermined condition; a sample block generation circuit for combining the ARP's with the BRP's to thereby generate a sample block; a reference frame subsampling channel for generating a sample reference frame (SRF) by subsampling the predetermined reference frame in accordance with the same method as that of generating the sample block through the block dividing circuit, the first decision circuit, the second decision circuit and the sample block generation circuit, wherein the SRF has a plurality of candidate blocks (CB's), the size of each CB being equal to that of the sample block; a best matching candidate block detection circuit, based on the sample block and the SRF, for detecting a CB having the smallest error value to the sample block among the CB's as a best matching candidate block by using a predetermined block matching method; and a motion vector generation circuit for generating a displacement between the sample block and the best matching candidate block as a motion vector (MV) corresponding to the sample block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
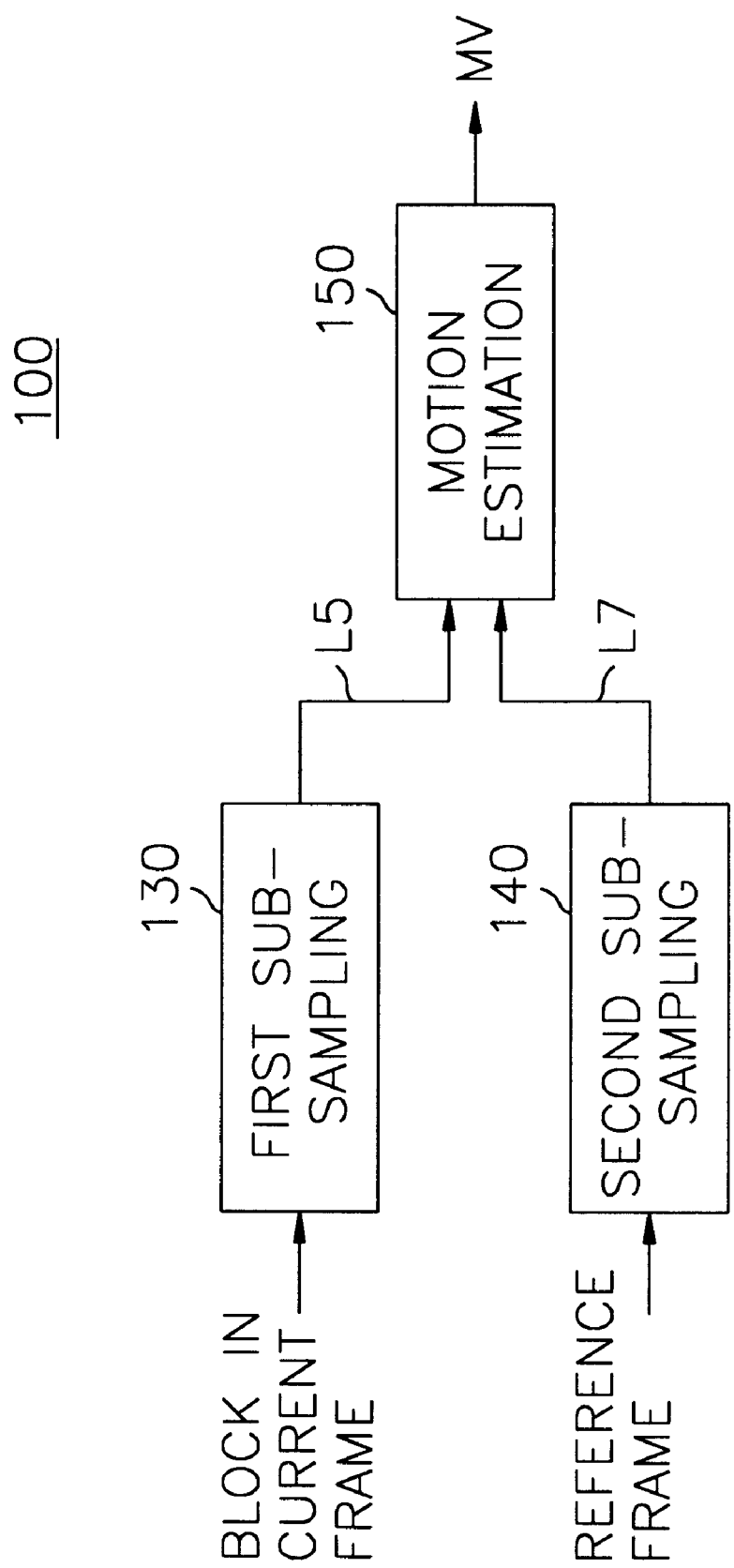
FIG. 1 illustrates a block diagram of a conventional motion estimation apparatus comprising subsampling circuits.
Figure 2A:
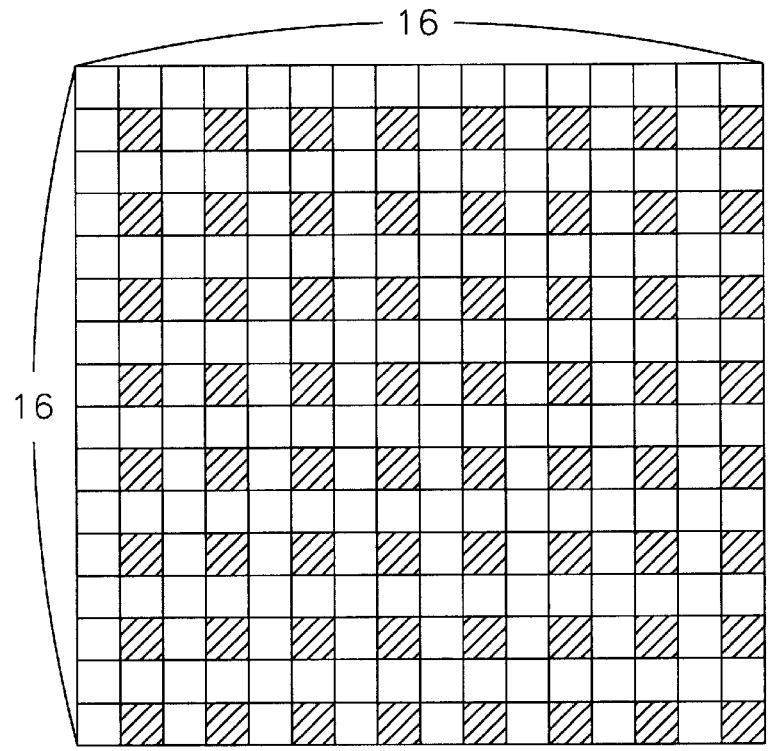
FIGS. 2A and 2B show a block and a sample block, respectively, for use in describing a conventional subsampling method.
Figure 2B:
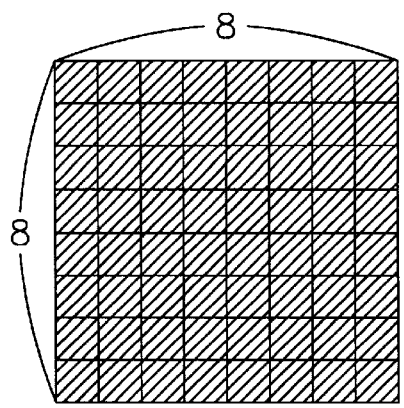
Figure 3:
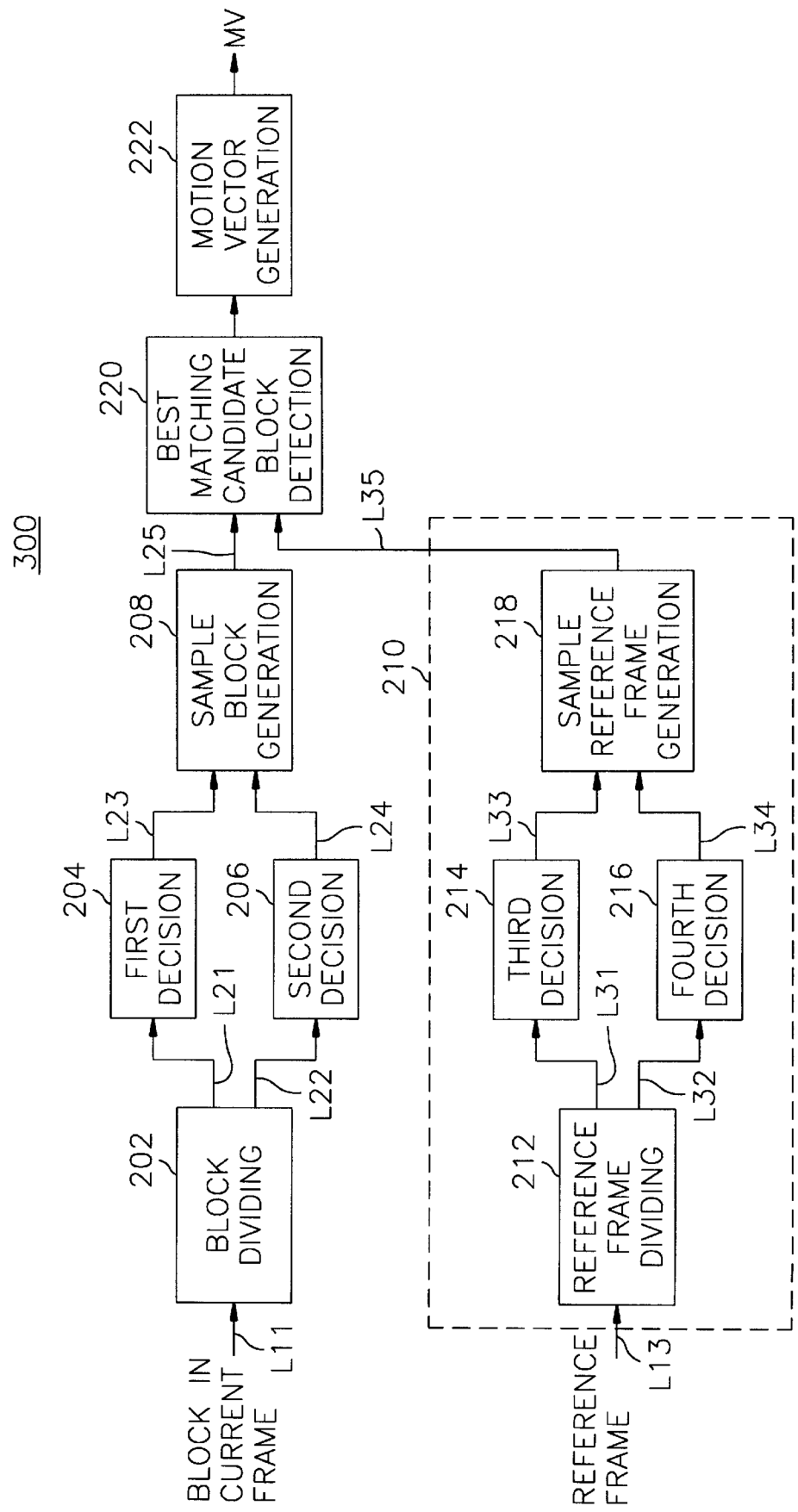
FIG. 3 depicts a block diagram of a motion estimation apparatus in accordance with the present invention.

Referring to FIG. 3, there is depicted a block diagram of a motion estimation apparatus 300 in accordance with the present invention. And referring to FIGS. 4A and 4B, there are represented a block and a sample block for use in describing a subsampling method employed in the apparatus 300 in accordance with a preferred embodiment of the present invention.

The apparatus 300 comprises a block dividing circuit 202, a first decision circuit 204, a second decision circuit 206, a sample block generation circuit 208, a reference frame subsampling channel 210, a best matching candidate block detection circuit 220 and a motion vector generation circuit 222. The reference frame subsampling channel 210 includes a reference frame dividing circuit 212, a third decision circuit 214, a fourth decision circuit 216 and a sample reference frame generation circuit 218.

In the apparatus 300, a block of N×M pixels within a current frame is inputted to the block dividing circuit 202 via a line L11 from a current frame memory (not shown), wherein N and M are predetermined positive integers, respectively. And a predetermined reference frame is inputted to the reference block dividing circuit 212 via a line L13 from a reference frame memory (not shown). It should be noted that the predetermined reference frame is usually a reconstructed previous frame reconstructed in accordance with a predetermined reconstruction method.

The block dividing circuit 202 divides the block into a plurality of subblocks (SB's) of K×L pixels and then classifies the SB's into A-group SB's and B-group SB's in accordance with the rule that all of the SB's in a same group be diagonally adjacent to each other.

Thereafter the block dividing circuit 202 provides the A-group SB's (ASB's) and the B-group SB's (BSB's) to the first decision circuit 204 and the second decision 206 via lines L21 and L22, respectively. It should be noted that K and L are predetermined positive integers which are dividers of N and M, respectively.

In accordance with a preferred embodiment of the present invention, N and K are equal to M and L, respectively. N and K are typically 8 and 2, respectively. And in another preferred embodiment of the present invention, N and K are 16 and 4, respectively.

Figure 4A:
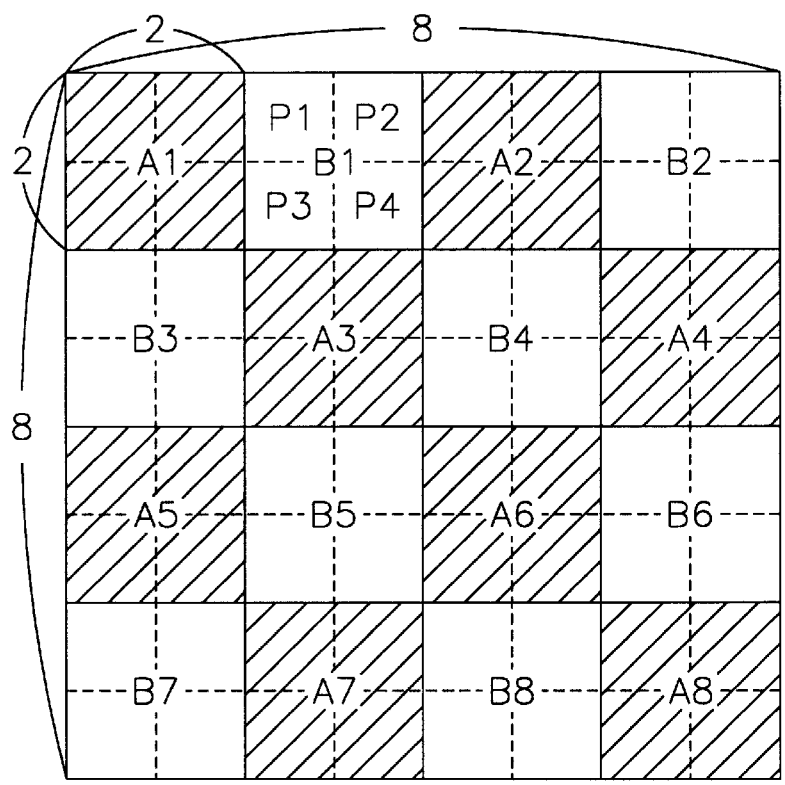
FIGS. 4A and 4B represent a block and a sample block, respectively, for use in describing a subsampling method in accordance with a preferred embodiment of the present invention.

For example, referring to FIG. 4A, there is represented a block 40 of 8×8 pixels including ASB's A1 to A8, each being represented as a hatched region therein, and BSB's B1 to B8, each being represented as a non-hatched region therein. In FIG. 4A, each of the ASB's A1 to A8 and each of the BSB's B1 to B8 have 2×2 pixels, respectively; and the BSB B1 has 4 pixels p1 to p4 as shown therein.

The first decision circuit 204 decides a pixel satisfying a first predetermined condition among the pixels in a ASB as an A-group representative pixel for the ASB. In accordance with a preferred embodiment of the present invention, the first predetermined condition is that the pixel has a maximum pixel value among the pixels.

In this way, the first decision circuit 204 decides A-group representative pixels (ARP's) corresponding to all of the ASB's and then supplies the ARP's to the sample block generation circuit 208 through a line L23.

The second decision circuit 206 decides a pixel satisfying a second predetermined condition among the pixels in a BSB as a B-group representative pixel for the BSB, wherein the second predetermined condition is different from the first predetermined condition.

In accordance with a preferred embodiment of the present invention, the second predetermined condition is that the pixel has a minimum pixel value among the pixels. For example, p2 is a pixel having a minimum pixel value among pixels p1 to p4, and p2 is decided as a RP corresponding to the BSB B1. In another preferred embodiment of the present invention, the second predetermined condition is that the pixel has an average pixel value of the pixels.

In this way, the second decision circuit 206 decides B-group representative pixels (BRP's) corresponding to all of the BSB's and then supplies the BRP's to the sample block generation circuit 208 through a line L24.

And then, the sample block generation circuit 208 combines the ARP's with the BRP's to thereby generate a sample block. It should be noted that at the sample block generation circuit 208, the ARP's are combined with the BRP's by placing each of the ARP's at a position corresponding to that of a corresponding ASB and at the same time by placing each of the BRP's at a position corresponding to that of a corresponding BSB.

Figure 4B:
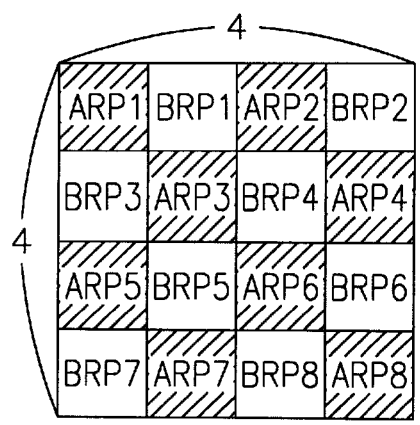

For example, referring to FIG. 4B, there is represented a sample block 45 of 4×4 pixels obtained by combining ARP's ARP1 to ARP8 represented as hatched regions with BRP's BRP1 to BRP8 represented as non-hatched regions, wherein ARPi and BRPi are an ARP and a BRP corresponding to Ai and Bi, respectively, i ranging from 1 to 8.

Meanwhile, the reference frame subsampling channel 210 generates a sample reference frame (SRF) on a line L35 by subsampling the predetermined reference frame in accordance with the same method as that of generating the sample block through the block dividing circuit 202, the first decision circuit 204, the second decision circuit 206 and the sample block generation circuit 208. It should be noted that the SRF has a plurality of candidate blocks (CB's), the size of each CB being equal to that of the sample block.

In detail, the reference frame dividing circuit 212 divides the reference frame into a plurality of reference subblocks (RSB's) of K×L pixels and then classifies the RSB's into A-group RSB's and B-group RSB's in accordance with the rule that all of the RSB's in a same group be diagonally adjacent to each other.

Thereafter, the reference frame dividing circuit 212 provides the A-group RSB's (ARSB's) and the B-group RSB's (BRSB's) to the third decision circuit 214 and the fourth decision 216 via lines L31 and L32, respectively. It should be noted that in accordance with a preferred embodiment of the present invention, the ASB's include a SB located at the top left-most SB position in the block and the ARSB's include a RSB located at the top left-most RSB position in the reference frame.

The third decision circuit 214 decides a pixel satisfying the first predetermined condition among pixels in a ARSB as an A-group typical pixel for the ARSB. In this way, the third decision circuit 214 decides A-group typical pixels (ATP's) corresponding to all of the ARSB's and then supplies the ATP's to the sample reference frame generation circuit 218 through a line L33.

The fourth decision circuit 216 decides a pixel satisfying the second predetermined condition among the pixels in a BRSB as a B-group typical pixel for the BRSB. In this way, the fourth decision circuit 216 decides B-group typical pixels (BTP's) corresponding to all of the BRSB's and then supplies the BRP's to the sample block generation circuit 208 through a line L34.

The sample reference frame generation circuit 218 combines the ATP's with the BTP's to thereby generate the SRF having the plurality of CB's. It should be noted that at the sample reference frame generation circuit 208, the ATP's are combined with the BTP's by placing each of the ATP's at a position corresponding to that of a corresponding ARSB and at the same time by placing each of the BTP's at a position corresponding to that of a corresponding BTB.

The best matching candidate block detection circuit 220, based on the sample block and the SRF, detects a CB having the smallest error value to the sample block among the CB's as a best matching candidate block by using a predetermined block matching method and then provides the best matching candidate block to the motion vector generation circuit 222.

The motion vector generation circuit 222 generates a displacement between the sample block and the best matching candidate block as a motion vector (MV) corresponding to the sample block.

Therefore, in accordance with the present invention, it is possible to provide a motion estimation method and apparatus to effectively detect a MV corresponding to a sample block for a block in a frame having high activity property thereof by employing subsampling method to thereby enhance the motion estimation accuracy thereof.

While the present invention has been described with respect to certain preferred embodiments only, other modifications and variations may be made without departing from the spirit and scope of the present invention as set forth in the following claims.

What is claimed is:

1. An apparatus for performing a motion estimation on a block of N×M pixels within a current frame based on a predetermined reference frame, N and M being predetermined positive integers, respectively, the apparatus comprising:

block dividing means for dividing the block into a plurality of subblocks (SB's) of K×L pixels and then classifying the SB's into A-group SB's and B-group SB's in accordance with the rule that all of the SB's in a same group be diagonally adjacent to each other, thereby providing the A-group SB's (ASB's) and the B-group SB's (BSB's), wherein K and L are predetermined positive integers which are dividers of N and M, respectively;

first decision means for deciding a pixel satisfying a first predetermined condition among the pixels in each of the ASB's as an A-group representative pixel for said each of the ASB's to thereby supply A-group representative pixels (ARP's) corresponding to the ASB's;

second decision means for deciding a pixel satisfying a second predetermined condition among the pixels in each of the BSB's as a B-group representative pixel for said each of the BSB's to thereby supply B-group representative pixels (BRP's) corresponding to the BSB's, wherein the second predetermined condition is different from the first predetermined condition;

sample block generation means for combining the ARP's with the BRP's to thereby generate a sample block;

reference frame subsampling means for generating a sample reference frame (SRF) by subsampling the predetermined reference frame in accordance with the same method as that of generating the sample block through said block dividing means, said first decision means, said second decision means and said sample block generation means, wherein the SRF has a plurality of candidate blocks (CB's), the size of each CB being equal to that of the sample block;

means, based on the sample block and the SRF, for detecting a CB having a smallest error value to the sample block among the CB's as a best matching candidate block by using a predetermined block matching method; and means for generating a displacement between the sample block and the best matching candidate block as a motion vector (MV) corresponding to the sample block.

2. The apparatus according to claim 1, wherein the first predetermined condition is that the pixel has a maximum pixel value among the pixels; and the second predetermined condition is that the pixel has a minimum pixel value among the pixels.

3. The apparatus according to claim 1, wherein the first predetermined condition is that the pixel has a maximum pixel value among the pixels; and the second predetermined condition is that the pixel has an average pixel value of the pixels.

4. The apparatus according to claim 2, wherein said reference frame subsampling means includes:

reference frame dividing means for dividing the reference frame into a plurality of reference subblocks (RSB's) of K×L pixels and then classifying the RSB's into A-group RSB's and B-group RSB's in accordance with the rule that all of the RSB's in a same group be diagonally adjacent to each other, thereby providing the A-group RSB's (ARSB's) and the B-group RSB's (BRSB's);

third decision means for deciding a pixel satisfying the first predetermined condition among the pixels in each of the ARSB's as an A-group typical pixel for said each of the ARSB's to thereby supply A-group typical pixels (ATP's) corresponding to the ARSB's;

fourth decision means for deciding a pixel satisfying the second predetermined condition among the pixels in each of the BRSB's as a B-group typical pixel for said each of the BRSB's to thereby supply B-group typical pixels (BTP's) corresponding to the BRSB's; and sample reference frame generation means for combining the ATP's with the BTP's to thereby generate the SRF having the plurality of CB's.

5. The apparatus according to claim 4, wherein the ASB's include a SB located at the top left-most SB position in the block and the ARSB's include a RSB located at the top left-most RSB position in the reference frame.

6. The apparatus according to claim 5, wherein said predetermined reference frame is a reconstructed previous frame reconstructed in accordance with a predetermined reconstruction method.

7. The apparatus according to claim 6, wherein N and K are equal to M and L, respectively.

8. The apparatus according to claim 7, wherein N and K are 8 and 2, respectively.

9. A method for performing motion estimation on a block of N×M pixels within a current frame based on a predetermined reference frame, N and M being predetermined positive integers, respectively, the method comprising the steps of:

(a) dividing the block into a plurality of subblocks (SB's) of K×L pixels and then classifying the SB's into A-group SB's and B-group SB's in accordance with the rule that all of the SB's in a same group be diagonally adjacent to each other, thereby providing the A-group SB's (ASB's) and the B-group SB's (BSB's), wherein K and L are predetermined positive integers which are dividers of N and M, respectively;

(b) first deciding to decide a pixel satisfying a first predetermined condition among the pixels in each of the ASB's as an A-group representative pixel for said each of the ASB's to thereby supply A-group representative pixels (ARP's) corresponding to the ASB's;

(c) second deciding to decide a pixel satisfying a second predetermined condition among the pixels in each of the BSB's as a B-group representative pixel for said each of the BSB's to thereby supply B-group representative pixels (BRP's) corresponding to the BSB's, wherein the second predetermined condition is different from the first predetermined condition;

(d) sample block generating to combine the ARP's with the BRP's, thereby generating a sample block;

(e) reference frame subsampling to generate a sample reference frame (SRF) by subsampling the predetermined reference frame in accordance with the same method as that of generating the sample block through said steps (a), (b), (c) and (d), wherein the SRF has a plurality of candidate blocks (CB's), the size of each CB being equal to that of the sample block;

(f) detecting a CB having a smallest error value to the sample block, based on the sample block and the SRF, among the CB's as a best matching candidate block by using a predetermined block matching method; and (g) generating a displacement between the sample block and the best matching candidate block as a motion vector (MV) corresponding to the sample block.

10. The method according to claim 9, wherein the first predetermined condition is that the pixel has a maximum pixel value among the pixels; and the second predetermined condition is that the pixel has a minimum pixel value among the pixels.

11. The method according to claim 9, wherein the first predetermined condition is that the pixel has a maximum pixel value among the pixels; and the second predetermined condition is that the pixel has an average pixel value of the pixels.

12. The method according to claim 10, wherein said step (e) includes the steps of:

(e1) reference frame dividing to divide the reference frame into a plurality of reference subblocks (RSB's) of K×L pixels and then classifying the RSB's into A-group RSB's and B-group RSB's in accordance with the rule that all of the RSB's of a same group be diagonally adjacent to each other, thereby providing the A-group RSB's (ARSB's) and the B-group RSB's (BRSB's);

(e2) third deciding to decide a pixel satisfying the first predetermined condition among the pixels in each of the ARSB's as an A-group typical pixel for said each of the ARSB's to thereby supply A-group typical pixels (ATP's) corresponding to the ARSB's;

(e3) fourth deciding to decide a pixel satisfying the second predetermined condition among the pixels in each of the BRSB's as a B-group typical pixel for said each of the BRSB's to thereby supply B-group typical pixels (BTP's) corresponding to the BRSB's; and (e4) sample reference frame generating to combine the ATP's with the BTP's to thereby generate the SRF having the plurality of CB's.

13. The method according to claim 12, wherein the ASB's include a SB located at the top left-most SB position in the block and the ARSB's include a RSB located at the top left-most RSB position in the reference frame.

14. The method according to claim 13, wherein said predetermined reference frame is a reconstructed previous frame reconstructed in accordance with a predetermined reconstruction method.

15. The method according to claim 14, wherein N and K are equal to M and L, respectively.

16. The method according to claim 15, wherein N and K are 8 and 2, respectively.

* * * * *